United States Patent [19]
Müller

[11] 4,042,001
[45] Aug. 16, 1977

[54] WEAR-RESISTANT LINK FOR TIRE CHAINS
[75] Inventor: Anton Müller, Aalen-Unterkochen, Germany
[73] Assignee: Eisen -und Drahtwerk Erlau Aktiengesellschaft, Aalen, Germany
[21] Appl. No.: 641,071
[22] Filed: Dec. 15, 1975
[30] Foreign Application Priority Data
    Dec. 14, 1974   Germany ............................ 2459280
[51] Int. Cl.² ............................................. B60C 27/06
[52] U.S. Cl. .................................. 152/243; 152/233; 152/241; 59/86
[58] Field of Search ................ 152/239, 233, 241–244, 152/171, 173; 59/85, 86, 93

[56]                  References Cited
                U.S. PATENT DOCUMENTS
    1,517,346   12/1924   Crandall ..................... 59/86
    3,595,292   7/1971    Muller ...................... 152/243
    3,835,908   9/1974    Rieger et al. ............... 152/243
    3,962,811   6/1976    Buschini et al. ............. 59/86

Primary Examiner—Drayton E. Hoffman
Attorney, Agent, or Firm—Walter Becker

[57]                  ABSTRACT

A wear-resistant link for tire chains, including a link body having at least one link opening between a running surface and a tire engaging surface for engagement with at least one connecting link. The surfaces defining the link opening merge with an outside area of the link body for forming an insert opening on this outside area. The wear resistant link is furthermore provided with at least one lock for the insert opening which lock includes at least one bolt or the like in engagement with the link body. The insert opening is located between the running surface and the tire engaging surface of the link body, and the lock is provided with at least one engaging surface. The arrangement is such that the respective link opening or openings in closed condition is or are defined by at least one engaging surface for engagement with the pertaining connecting link when the respective tire chain equipped with the wear resistant link is in operation.

6 Claims, 18 Drawing Figures

Fig.1
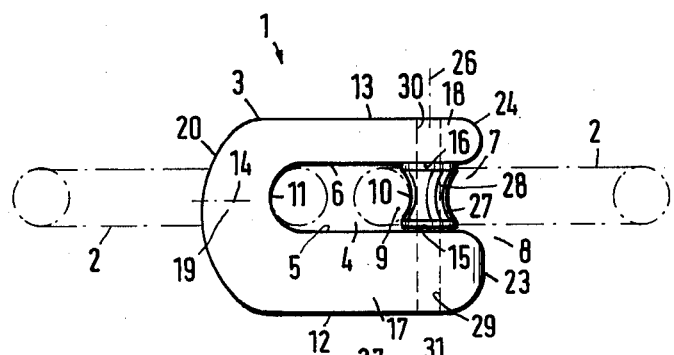
Fig.3
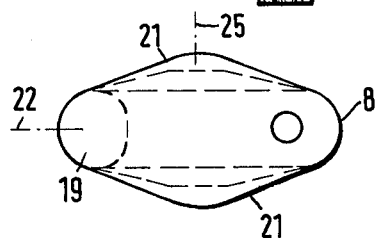
Fig.2

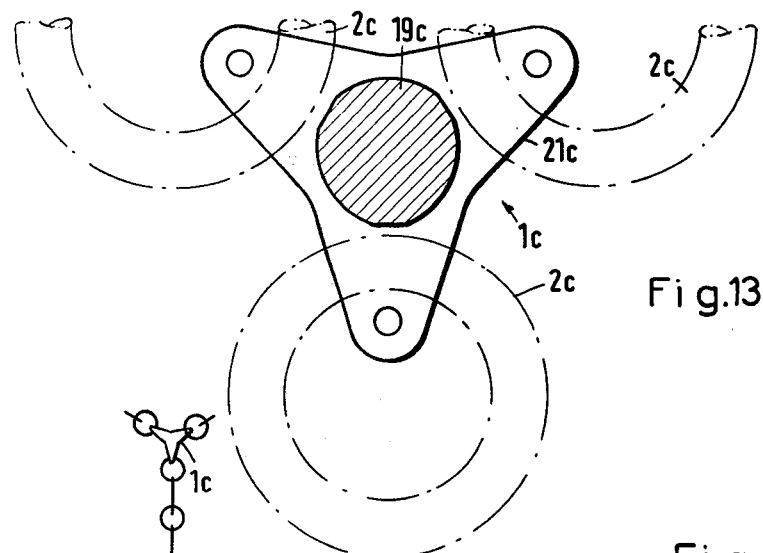
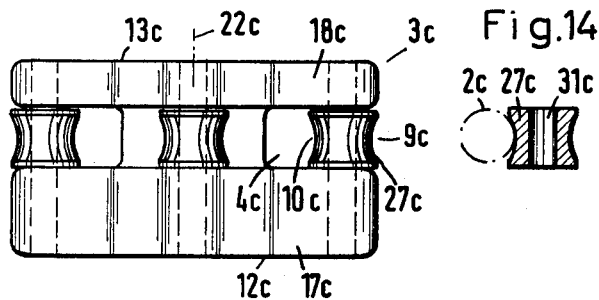
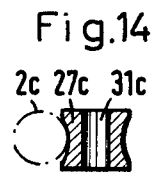
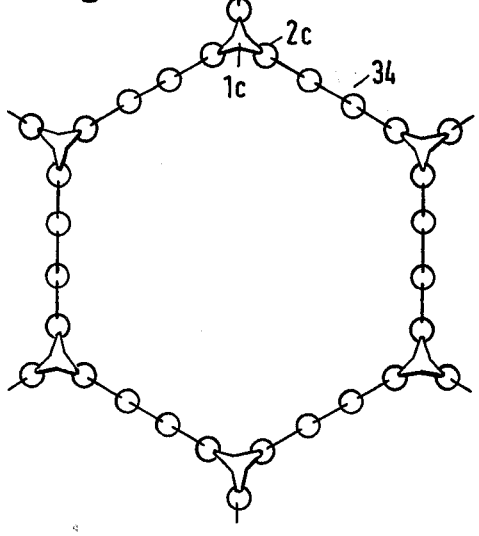
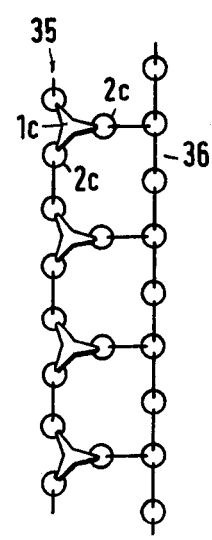

WEAR-RESISTANT LINK FOR TIRE CHAINS

The present invention relates to wear-resistant links for tire chains, especially running links with a link body which for engagement by at least one connecting link for instance an annular link comprises at least one link opening between a running and a tire engaging surface. For purposes of forming an insert opening located on the outside of the link body, the confining surfaces of said link opening merge with said outer side and with at least one lock for the insert opening. The lock comprises a bolt or the like engaging said link body. The respective link opening in closed condition is confined by at least one engaging surface for engagement with the pertaining connecting link during operation of the tire chain.

A wear-resistant link of the above mentioned type has become known which is provided as connecting and closure link for a tire chain. In the web-shaped or plate-shapped link body of this wear resistant link there is provided as the link opening a longitudinal slot which is parallel to the running edge. The link body also is provided with an insert opening which faces the tire and is adapted to be closed by means of a lock. This lock is formed by a screw bolt with a nut. The head of said screw bolt is located on one lateral surface of the link body, whereas the nut is provided at the oppositely located lateral surface. As a result thereof, the engaging surfaces are formed directly by the link body itself. Inasmuch as the link body at permissible expense can be produced only in conformity with certain manufacturing processes, and therefore cannot be produced in any desired shape and with the required precision, the engaging surfaces cannot meet to a maximum extent the repective optimum requirements. This entails a relatively large so-called inner wear of the tire chain inasmuch as during the operation of the tire chain, due to the deforming work, always links in frictional engagement with each other within the region of the interengaging surfaces, will bring about a high wear of the wear-resistant links and also of the connecting links which in most instances are parallel to the plane of the stretched-out tire chain.

A further drawback of the above design is seen in the fact that the lock extends into the longitudinal slot which with its two ends forms two link openings so that the longitudinal slot and thus the link body has to be relatively long in order to permit an engagement of the connecting links. This design, therefore, results in relatively long links and therefore causes a relatively great chain pitch which is not desired in particular with tire protective chains which are provided as protective armor for pneumatic tires.

It is, therefore, an object of the present invention so to design a wear-resistant link of the above mentioned type that a considerable reduction of the inner wear of the tire chain will be realized.

This object and other objects and advantages of the invention will appear more clearly from the following specification in connection with the accompanying drawings, in which:

FIG. 1 is a view of a wear-resistant link according to the present invention.

FIG. 2 shows a bottom view of the wear-resistant link according to FIG. 1.

FIG. 3 represents a section through a portion of the wear-resistant link of FIG. 1.

Figure 10:
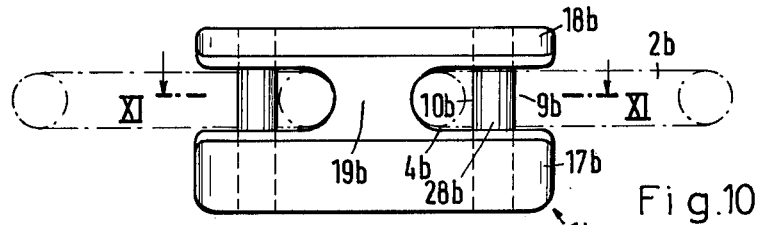
FIG. 10 shows still another embodiment of a wear-resistant link according to the invention in a way of illustration similar to that of FIG. 1.
Figure 11:
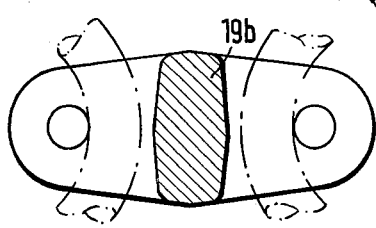
FIG. 11 represents a section taken along the line XI—XI of FIG. 10.

FIGS. 12 and 13 respectively illustrate a further embodiment of a wear-resistant link in a manner corresponding to FIGS. 10 and 11.

FIG. 14 is a section through a portion of the wear-resistant link according to FIG. 12.

FIGS. 15 and 16 respectively illustrate two embodiments of the application of the wear-resistant link according to FIGS. 12 and 13.

Figure 17:
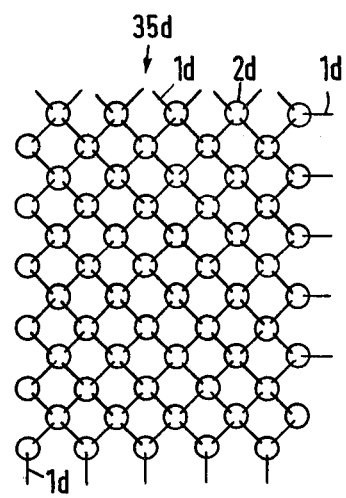
Figure 18:
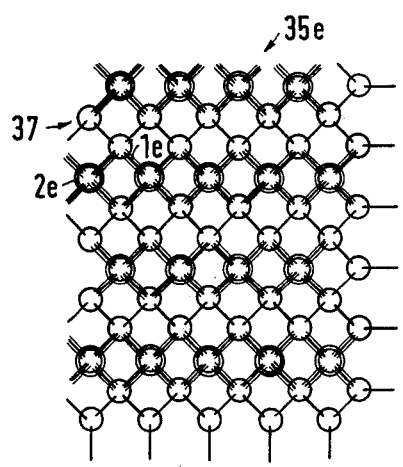

FIGS. 17 and 18 represent cut-outs of tire chains according to the present invention.

The wear-resistant link according to the present invention is characterized primarily in that the insert opening is located between the running surface and the tire engaging surface, and that at least one engaging surface is provided on the lock. As a result thereof, the lock is located in spaced relationship to the running surface as well as to the tire engaging surface and is protected within the region of an outer surface of the link body. This outer surface extends in a transverse direction with regard to said running surface and tire engaging surface so that it will not be exposed to any wear-resistant forces by contact with the running path of the tire. Furthermore, the engaging surface provided on the lock in a simple manner can be adapted as to form or shape to the respective requirements inasmuch as the lock can be made separately from the link part and can be formed nearly at will. If the structural element which forms the engaging surface has been worn, it can easily be exchanged by the design according to the invention for a new structural elememt forming the engaging surface. This exchange can be effected without having to exchange the entire link body. This is due to the fact that the structural element which forms the engaging surface is formed by a structural element which is separate from the link body and is exchangeably connected thereto. Inasmuch as the insert opening does not engage the tire engaging surface, the wear-resistant link according to the invention can also easily be mounted when a tire chain is arranged on the tire.

The wear-resistant link which may also be called the wear link is particularly suitable as a closure link on the butt area of the tire chain. The closure links which are built in at this area are in most instances after a 50% wear, the cause for chain breaks. It is for this reason that these closure links as a rule have to be exchanged from two to three times during the entire lifetime of the tire chain. In particular, when utilizing the tire chain on construction machines, such design brings about disadvantageous stopping time or idling periods.

The wear link according to the invention is, however, also suitable for the running part and/or the side part of the tire chain, for instance 20 that the running or side part consists primarily only of wear links according to the invention and of connecting links engaging the same. Expediently, wear and connecting links are alternately provided in such a way that each wear link is engaged by at least two connecting links, and each connecting link is engaged by at least two wear links. Since the links in view of the design of the wear link according to the invention are easily installed and can easily be disengaged from each other, it is possible from such links to prepare in a minimum of time tire chains of any desired size with nearly any desired configuration, and it is also possible to change already fixedly installed tire chains as to their size and configurations. It is furthermore possible to rebuild worn-off chains directly at the place of use, by exchanging the worn links without having to exchange entire net sections as for instance the middle nets of the tire chain. A further advantage of building a tire chain in the above mentioned manner consists in that the materials selected for the wear-resistant links and the connecting links under optimum conditions can be adapted to the respective requirements inasmuch as the wear links prior to their connection with the connecting links may be subjected to a heat treatment, for instance may be hardened. As a result thereof, the wear links may be so designed that they are able to absorb extremely high wear stresses, whereas the connecting links may be so designed that they are suitable for the absorption of high pull stresses that occur. If the wear link is utilized as closure link on a butt area, it is expediently so designed that it will last the same lifespan as the remaining running links of the tire chain; this means that it has the same wear volume as said web links and possibly also in a maximum worn condition has still about the same pull resistance as the connecting links.

The wear link according to the invention is suitable particularly for tire protective chains as a tire armor.

Referring now to the drawings in detail, it will be seen from FIGS. 1-3 that a wear link 1 for the connection with connecting links 2 indicated by dot-dash lines comprises a link body 3 with a single link opening 4, the confining surfaces 5, 6 of which, for forming an insert opening 7 extend up to an outer side 8 of the link body 3. Said insert opening 7 is adapted to be closed by a lock 9. In closed condition according to FIG. 1, the link opening 4 is defined by two engaging surfaces 10, 11 for respective engagement with a connecting link 2 while the connecting links 2, when the chain is in stretched-out condition, or during the operation of the tire chain engages said engaging surfaces.

The link body 3 comprises on its lateral surfaces a substantially straight running surface 12 and on the opposite side thereto a substantially rectilinear tire engaging surface 13 which extends parallel to the running surface 12. The running surface 12 and the tire engaging surface 13 are parallel to the connecting straight line or to the common central plane 14 of the engaging surfaces 10, 11 which are located therebetween and extend in the direction of said connecting straight line approximately over the entire pertaining extension of the link body 3. The link opening 4 is located in spaced relationship with regard to the running surface 12 as well as to the tire engaging surface 13. The central plane thereof or the central plane 14 of the engaging surfaces 10, 11 are located closer to the tire engaging surface 13 than to the running surface 12.

Also the insert opening 7 is arranged in spaced relationship to the running surface 12 as well as to the tire engaging surface 13, and advantageously symmetrically with regard to the central plane 14 in such a way that it is closer to the tire engaging surface 13 than to the running surface 12. The confining surfaces 5, 6 of the link opening 4 which in side view according to FIG. 1 extend parallel to the running surface 12 or tire engaging surface 13, and the corresponding confining surfaces 15, 16 of the insert opening 7 which extend parallel to the running surface 12 or the tire engaging surface 13 merge in side view according to FIG. 1 without interruptions rectilinearly with each other in such a way that the insert opening 7 at a right angle to the running surface 12 or tire engaging surface 13 has the same width as the link opening 4. As a result thereof, the connecting links 2 with a compact design of the wear link 1 can easily be introduced into the link opening 4. The link opening 4 as well as the insert opening 7 are confined by two substantially parallel extending arms 17, 18 of the link body 1. These arms at those sides which face away from each other form the running surfaces 12 and on the other hand form the tire engaging surface 13 and at those sides which face each other form the confining surfaces 5, 15, and on the other hand form the confining surfaces 6, 16. The thickness of the arm 17, which forms the running surface 12 and when measured at a right angle to the running surface 12 or tire engaging surface 13, is greater than the thickness of the arm 18 for instance twice as thick. At the free ends of the arms 17, 18 there is arranged the lock 9 by means of which the arms are supported relative to each other. Within the region of those ends of arms 17, 18 which face away from the lock 9, the two arms 17, 18 are connected to each other by means of a supporting part 19 which extends approximately at a right angle to the running or tire engaging surface. The supporting part 19 forms one single piece with the arms 17, 18 but may also be formed by a separate detachable structural element, for instance by a bolt or a lock so that in such an instance the running surface 12 and the tire engaging surface 13 are formed by separate structural elements detachable from each other. The end edge 20 of the link body which is formed by the supporting part 19 and located at that side of the link body 3 which faces away from the outside 8 or the insert opening 7 in side view according to FIG. 1 is curved with a radius of curvature which is greater than half the distance between the tire engaging surface 12 and the running surface 13 but is shorter than said distance. On the other hand, the end edge 20 in view according to FIG. 2 is semicircularly curved in such a way that it merges similar to the outside 8 tangentially with the lateral surfaces 21 of the link body. On its inner side which faces the link opening 4, the supporting part 19 forms an engaging surface 11 which in cross section through the central plane 14 for adaptation to the pertaining connecting link 2 is curved convexly and in side view according to FIG. 1 is curved semi-circularly in such a way that it merges tangentially with the confining surfaces 5, 6. Due to the described design, the link body 3 is formed by a simple asymmetric U-shaped structural element. The arms 17, 18 which form the U-legs have approximately the same length but have different thicknesses and as the case may be in the view according to FIG. 2 also have different widths in such a way that the arm 17 forming the running surface is wider than the arm forming the tire engaging surface 13. The link body 3 is, however, substantially symmetric to the central plane 1 which is at a right angle to the running surface 12 or tire engaging surface 13.

As will be evident in particular from FIG. 2, at least the arm 17 which forms the running surface 12 when viewing the running surface 12 or the tire engaging surface 13 tapers toward its free end 23 at an acute angle so that the arm 17 from this end 23 at least approximately up to the center of the length is broadened over its entire thickness. Similarly, the arm 17 broadens from its other end namely from the supporting part 19 toward the center of the length of the link body 3 over its entire thickness in such a way that the running surface 12 or arm 17 in conformity with the view of FIG. 2 has a rhombus or diamond shape while its length is about twice its maximum width. The lateral surface sections of the arms 17 which are arranged respectively on the same lateral surface 21 of link member 3 at an angle of approximately for instance 140° with regard to each other merge with each other along a section of a circle. The end surface 23 of arm 2 is similar to the end surface 24 of arm 18, and when viewing the running surface 20 or the tire engaging surface 13 is rounded along a portion of a circle in conformity with the end edge 20 in such a way that the end surface 23 tangentially merges with the pertaining lateral surface section. In side view according to FIG. 1, the end edge 23 of arm 17 is rounded approximately over a quarter of a circle and merges tangentially with the pertaining confining surface 15 of the insert opening 7. Similarly, over a quarter of a circle but with a greater radius of curvature, the end surface 23 which in side view according to FIG. 1 comprises a straight section located about at the right angle to the running surface 12, tangentially merges with the running surface 12. The end face 24 of arm 18 in side view according to FIG. 1 is rounded relative thereto over a semicircle in such a way that said end face 24 tangentially merges with the pertaining confining surface 16 of the insert opening 7 and also merges with the tire engaging surface 13. The arm 18 which forms the tire engaging surface 13 may in the view according to FIG. 2, as has been described in connection with arm 17, also be so designed that it has about the same contour as arm 17 when placed thereon. Due to the described design, the arms 17, 18 are plate-shaped and parallel to the running surface 12 or to the tire engaging surface 13 or to the central plane 14 so that they cover a relatively large surface of the tire. Expediently, the running surface 12 or tire engaging surface 13 is also approximately symmetrical to the central plane 25 of the link body 3, which central plane 25 extends at a right angle with regard to the connecting line between the engaging surfaces 10, 11.

As will be seen from FIGS. 1 to 3, the lock 9 forms a pivot bearing for the pertaining connecting link 2 while the bearing axis 26 of said pivot bearing in said view according to FIG. 1 is located at a right angle to the running surface 12 or tire engaging surface 13 and thus to the central plane 14 in the central plane or plane of symmetry 22. The bearing axis 26 is provided in spaced relationship to the outside 8 or end surfaces 23, 24 of arms 17, 18 and also in spaced relationship to the pertaining engaging surface 10. With the illustrated embodiment, the engaging surface 10 is formed by a sleeve-shaped roller 26 according to FIG. 3 which is located in the bearing axis 26 and is rotatably arranged on a bolt 28. The bolt 28 which is longer than the roller 27 has its ends engaging bores 29, 30 which extend all the way through the arms 17, 18 and are arranged therein with press fit while extending on one hand nearly to the running surface 12 and on the other hand approximately to the tire engaging surface 13. The bolt 28 may be formed for instance by two coaxial pins namely an outer sleeve-shaped spring cotter which engages the bores of roller 27 and of link 3 and a pin inserted into said spring cotter and being sleeve-shaped or having a solid cross section and engaging the inner surface of said spring cotter by press fit. The diameter of the bore 31 of roller 27 is slightly greater than the outer diameter of the bolt 28 so that the roller 27 will be easily rotatable. The axial extension of roller 27 is only by the necessary play shorter than the shortest distance between the confining surfaces 15, 16 of the insert opening 7 so that the roller 27 is axially secured between said confining surfaces and in addition thereto can support the two arms 17, 18 with regard to each other against the running pressure. Inasmuch as the engaging surface 10 is provided on the roller 17 and said roller continuously turns relative to the link body 3 in view of the inner movements of the tire chain, a very long lifespan is obtained for said engaging surface 10. The largest diameter of roller 27 is less than twice the distance of the bearing axis 26 from the outside 8 or the end surfaces 23, 24 and is less than the width of the arms 17, 18 so that the roller 27 stands back with regard to the end surfaces 23, 24 and with regard to the lateral surfaces 21 of the link body 3. In view of the described design, with the short overall length of the link body 3, the distance between the engaging surfaces 10, 11 may be relatively short, namely less than the inner diameter of the connecting links 2, for instance half as long as the total length of the link body 3 and about equally as long as its largest width so that with a large surface armor of the tire a low chain pitch is obtained. With the illustrated embodiment, the connecting links 2 are formed by circular annular links, the cross sections of which are circular. The connecting links 2 are for instance made by bending a correspondingly long section of a round steel piece and butt welding its ends together. The engaging surface, which is formed by the lock 9 is adapted to the (in this instance circular) cross section of the connecting link 2 in such a way that the engaging surface 10 in side view of FIG. 1 is curved with a radius of curvature which approximately corresponds to the radius of curvature of said cross section or with the radius which is only slightly greater. For purposes of forming the engaging surface 10, the circumference of the roller 27 is provided with a circumferential groove which in axial section extends concavely inwardly while the engaging surface 10 extends over an arc angle of less than 180°, namely approximately 90° or slightly more. The engaging surface 10 which is located symmetrically with regard to the center of the length of roller 27 may extend to the end faces of roller 27 which extend at a right angle to the bearing axis 26 but expediently according to FIGS. 1 and 3 has its side edges merged with the cylindrical end collars 32 the thickness of which is less than the height of the engaging surface 10. The distance between the confining surfaces 5, 6 and 15, 16 respectively is only slightly less than the thickness or the cross sectional diameter of the connecting links 2, the inner diameter of which, however, is greater than the greatest width of the link body 3 so that a high movability is assured. The roller 27 may be made of steel and may be hardened and has a shortest outer diameter which is less than the inner diameter of the connecting link 2. Said outer diameter may amount to about 1/6 of the inner diameter of the connecting link 2. The thickness of arm 18 is less than the distance between the confining surfaces 5, 6 and 15, 16, and less than the thickness of the connecting links 2, whereas the thickness of the arm 17 is greater than the thickness of arm 18.

In FIGS. 4–14, those parts which correspond to the parts of FIGS. 1 to 3 have been designated with the same reference numerals as in FIGS. 1 to 3 but with the additional character a. Those parts in FIGS. 10 and 11 which correspond to those of FIGS. 1 to 3 have been designated with the same reference numerals as in FIGS. 1–3 but with the additional character b. Similarly, the elements of FIGS. 12–14 which correspond to those of FIGS. 1–3 have been designated with the same numerals as in FIGS. 1–3 but with the additional character c.

In the embodiment illustrated in FIGS. 4–9, the link body 3a comprises two pairs of arms 17a, 18a which respectively point in opposite directions and freely project from the supporting part 19a and similar to the supporting part 19a are located symmetrically with regard to the central plane 25a of the link body 3a. Both arms 17a which are formed primarily by a continuous plate together form the uninterrupted running surface 12a in the same manner as the two arms 18a located in a common plane or forming a continuous plate, together form the tire engaging surface 14a. The running surface 12a is formed by two surface sections located at both sides of the longitudinal central plane 22a and arranged symmetrically to the latter, said surface sections being located relative to each other at an obtuse angle of for instance approximately 160° opening toward the tire engaging surface 13a. The tire engaging surface 13a is also formed by corresponding surface sections which are located symmetrically with regard to the longitudinal central plane 22a in which instance, however, the angle opening toward the running surface 12a between said surface sections is greater than the corresponding angle of the running surface 12a and amounts for instance to about 170°. Also the confining surfaces 5a, 15a and 6a, 16a are formed by substantially plane surface sections which are located on both sides of the longitudinal central plane 22a and are symmetrical to the latter. The surface sections forming the confining surfaces 5a, 15a of the respective arm 17a form an angle of approximately 170° opening toward the running surface 12a and being greater than the angle of the running surface 12a or equalling the angle of the tire engaging surface 13a. The surface sections of the confining surfaces 6a, 16a have about the same angle opening toward the tire engaging surface 13a. As a result thereof, the thickness of the respective arm 17a, 18a within the region of the longitudinal central plane 22a is greater than on the lateral surfaces 21a of the link body 3a.

Figures 5, 6:
FIG. 5 represents a bottom view of the link body of FIG. 4.
FIG. 6 is a section taken along the line VI—VI of FIG. 4.

As will furthermore be evident from FIG. 6, the lateral edges of the arms 8a when viewed in cross section are rounded along a portion of a circle in such a way that they tangentially merge with the confining surfaces 6a, 16a and with the tire engaging surface 13a so that the tire will be saved to a high degree. The lateral edges of the arms 17a are approximately parallel to the longitudinal central plane 22a and merge tangentially with the confining surfaces 5a, 15a and running surfaces 12a over partially rounded sections.

Figure 8:
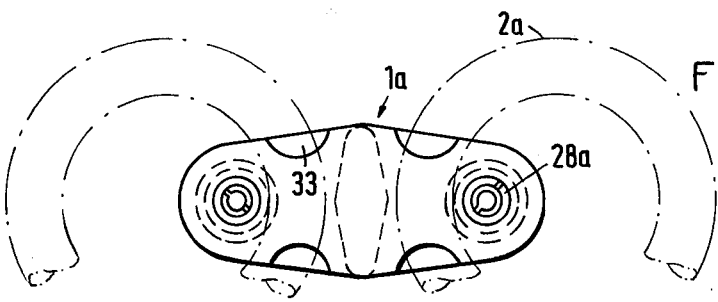

The nearly plate-shaped supporting part 19a which is located within the region of the greatest width of the link body 3a extends up to both lateral surfaces 21a of the link body and has its largest extension in the direction of the connecting straight line of said lateral surfaces. This greatest extension is greater than twice its height while the extension of the supporting part 19a in the longitudinal direction of the link body is shorter. In the view according to FIG. 5, and in cross section respectively, the supporting part 19a has a nearly rhombus shaped or diamond shaped form while it is rounded along a portion of a circle within the region of its acute angular edges located on the lateral surfaces of the link body. Adjacent to said supporting part 19a, the arms 18a forming the tire engaging surface 13a at their longitudinal edges are provided with recesses 33 which when viewing the tire engaging surface 13a, according to FIG. 8 are confined by a portion of a circle having an arc angle of less than 180° and extend over the entire thickness of the arms 18a. The recesses 33 which are arranged in spaced relationship on both sides of the supporting part 19a and are located on both lateral surfaces of the link body reduce the weight of the link body 3a and improve its engagement with the tire.

In view of the described design, the link body 3a respectively forms on both sides of the supporting part 19a a link opening 4a with an insert opening 7a so that both connecting links 2a can be disengaged independently of each other or can be connected independently of each other to the wear member 1a. Each insert opening 7a is adapted to be closed by a separate lock 9a. Each lock is formed primarily by a roller 27a and a bolt 28a holding said roller. Each of the two separate link openings 4a separated from each other by the supporting part 19a is confined by only one single engaging surface 10a each having only one connecting link 2a, while both engaging surfaces 10a are each formed by a roller 17a. Both rollers 27a are similar to the connecting links 2a of the same design. As will be seen from FIG. 6, the bore 30a in arm 18a may also be formed by a threaded bore in which instance the bolt has a correspondingly long threaded section having a diameter greater than that of the cylindrical or smooth shank of the bolt; the shank engages the bores 19a, 31a.

Figure 4:
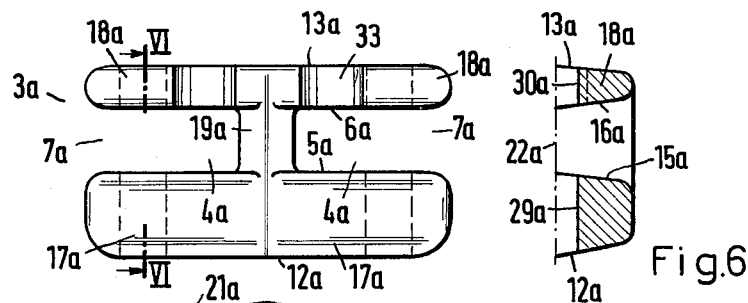
FIG. 4 illustrates a view of a link body of a further wear-resistant link according to the invention.
Figures 7, 9:
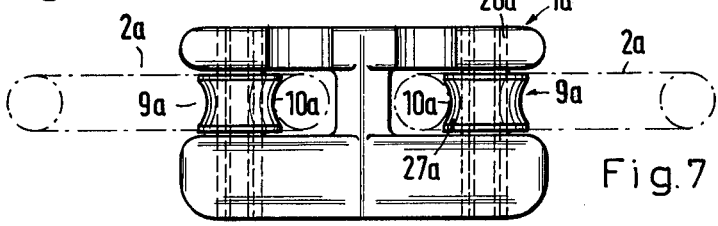
FIGS. 7 and 8 illustrate the wear-resistant link mounted while utilizing the link body according to FIGS. 4–6 in a manner illustrated similar to FIGS. 1 and 2.
FIG. 9 shows a section of a portion of the wear-resistant link according to FIG. 7.

As will be seen from FIG. 7, the connecting links 2a have those sections thereof which engage the engaging surfaces 10a located directly adjacent to the supporting part 9a which, however, they do not touch and from which they are spaced by a distance considerably less than the height of the link openings. Due to this design, the link body 3a is in side view according to FIG. 4 is H-shaped.

As will be seen from FIGS. 10 and 11, the respective lock 9b may also be formed by bolts 18b only. That section of bolt 28b which is located between the arms 17b, 18b then with its circumferential surface directly will form the engaging surface 10b. In this instance, the bearing axis of the pivot bearing for the connecting link 2b is located in this engaging surface 10b and not, as is the case with the embodiments of FIGS. 1–9, in spaced relationship to the center of the connecting link 10b. The connecting links 10b are shown in FIG. 10 in a position in which their sections located in the link openings 4b engage those outer surfaces of supporting part 19b which face toward said connecting links 2b. These outer surfaces in side view according to FIG. 10 are adapted to the cross section of connecting links 2b, namely they are semi-circularly rounded in such a way that the supporting body 19b has its least width in the middle of its height and from said middle increases in width toward the arm 17b as well as toward the arm 18b.

The link body 3c of the wear link 1c according to FIGS. 12-14 has three uniformly distributed pairs of arms 17c, 18c while all arms 17c together form the running surface 12c and all arms 18c together form the tire engaging surface 13c. The pairs of arms are distributed in the manner of a star uniformly about the central axis 22c of the link body 3c. This central axis extends at a right angle with regard to the running surface 12c and the tire engaging surface 13c. The pairs of arms project radially from said central axis 22c. In the central axis 22c there is provided a supporting part 19c crosswise nearly circular or nearly cylindrical in cross section that is approximately trochoidal and having a flat section in its circumferential zone which faces the respective link opening 4c. Each pair of arms forms a link opening 4c with an insert opening adapted to be closed by lock 9c. All locks 9c, similar to all pairs of arms are of identical design and respectively comprise rollers 17c forming the engaging surface 10c. The lateral edges 21c of adjacent arms 17c, 18c located at an obtuse angle with regard to each other merge with each other in radially spaced relationship to the outer surface of the supporting part 19c. In view of the described design, three connecting links 2c can be inserted into the star-shaped or diamond-shaped closure link 1c. It is also possible to provide the wear link with more than three pairs of arms, for instance four or five pairs uniformly distributed about the central axis.

FIG. 15 shows wear links 1c according to FIGS. 12-14 in a cut-out of a tire chain. These wear links 1c are located in the nodule points of the tire chain at which three chain sections meet each other at an angle. Those end links 2c of this chain section which face each other respectively engage a separate lock 9c of the pertaining wear link 1c. The illustrated tire chain comprises chain configurations which close each other in a hexagonal or honeycomb manner and are provided with uniformly long chain sections which extend at an incline or parallel to the tire running direction. Each of said last mentioned chain sections comprises four connecting links and three web links connected by said connecting links. The last mentioned links may be formed by two links according to the invention, namely the wear links 1 according to FIGS. 1-3 and/or wear links according to FIGS. 4-11.

The wear links 1c according to FIGS. 12-14 are also suitable according to FIG. 16 for connecting the central part 35 of a tire chain with the outer and/or inner side chain 36 of the tire chain. One pair of arms each and a lock of each wear link 1c serve for connection with the side chain 36, whereas the two remaining locks are utilized for connection to the central part 35. In the illustrated embodiment, the lock connected to the side chain 36 is engaged by a connecting link 2c which in turn through a web link, and a wear link according to the invention or the like is connected to an annular link of the side chain 36. The two other locks engage connecting links 2c of the central part 35. The connecting links 2c are arranged in circumferential direction one behind the other. Each two adjacent connecting links 2c which engage adjacent wear links 1c through the intervention of a web link, a wear link according to the invention, or the like, are interconnected and additional links of the tire chain, for instance links according to FIGS. 1 to 14, are adapted to engage said connecting links 2c.

FIG. 17 shows a chain net 35d of a central portion of a tire chain. This central portion has substantially square-shaped configurations in such a way that each connecting link 2d is engaged by a wear link 1d each connecting link 2d is engaged by a wear link 1d substantially each wear link 1d is engaged by two connecting links 2d. The wear links 1d and connecting straight lines between the two respective connecting links 2d engaging a wear link 1d from an angle of about 45° with regard to the circumferential direction. At the butt area, the central part comprises wear links 1d located in circumferential direction of the tire. For purposes of connection with the respective side chain, the central part has wear links 1d which are located one behind the other and at a right angle to the tire circumferential direction. The wear links 1d within the central net and/or the wear links at the butt area and/or the wear links 1d for connection with the wide chain according to the requirements may be formed by wear links according to FIGS. 1-3, 4-9, 10-11 or 12-14.

According to the embodiment of FIG. 18, in the central part 35e, each of the connecting links 2e illustrated in heavier lines, is engaged by four wear links according to the invention of one of the described embodiments. These connecting links 2e are arranged in parallel rows with regard to each other, and these rows are expediently located in the tire circumferential direction or at a right angle thereto. These rows of the connecting links 2e or their wear links 1e are not directly connected to each other but are connected to each other by chain strands 37 located in a zigzag form therebetween. The chain strands 37 are formed by sections of chains sold by the yard. These sections expediently consist of alternate for instance, non-detachable interengaging connecting or annular links and web links. These connecting links may be designed similar to the connecting links 2e engaging the wear links 1e according to the invention. With the illustrated embodiment, the above mentioned rows of the connecting links 2e are located so close to each other that each connecting link of the chain strand 37 is connected with two wear links 1e of one of these rows. These two wear links 1e in turn engage two adjacent links 2e of this row so that there is obtained substantially the same chain configuration as in FIG. 17. For connection with the side chain as well as for connecting the ends of the tire chain, the butt areas thereof are expediently provided with wear links according to the invention which correspond to the described embodiments comprising H-shaped link bodies. With a particularly heavy duty tire chain, it is possible in the running part to use wear links of the described type with H-shaped link bodies and on the side parts to use wear links with U-shaped link bodies.

It is, of course, to be understood, that the present invention is, by no means, limited to the specific showing in the drawings, but also comprises any modifications within the scope of the appended claims.

What I claim is:

1. A connection member for chains, especially for protective tire chains, with a link body consisting of two arms parallel to each other and interconnected by a transverse piece extending substantially at right angles therebetween such that an essentially U-formed structural part is formed thereby defining an inlet and receiving opening lying between the arms, and having a bearing piece formed by a bolt limiting the receiving opening for a chain member suspended in the receiving opening and arranged at least partially at right angles to the arms of the link body, the improvement therewith which comprises plate means of different thickness forming both of the arms, at least the thickest of said plate means having a smaller width measured in the vicinity of the bolt at right angles to the axis of the bolt than the width in an adjoining region of the receiving opening.

2. A connection member according to claim 1 in which said plate means taper at an acute angle from the receiving opening in the direction of the inlet opening, said plate means having plate edges extending at acute angles relative to each other, said edges having a rounded transition relative to each other.

3. A connection member according to claim 2 wherein smooth limiting surfaces of the receiving opening and the inlet opening are formed by uninterrupted smooth surfaces of said plate means.

4. A connection member according to claim 1 wherein the transverse piece extends over half the length and over the entire width of the arms.

5. A connection member according to claim 4 wherein the arms have an approximately rhombus or diamond shaped contour.

6. A connection member according to claim 1 wherein the arms are star shaped with at least three arm sections and that in the region of free ends of the arm sections each is provided with one bearing piece and that the transverse part is centrally arranged as to said plate means.

* * * * *